United States Patent
Dunn

[19]

[11] Patent Number: 5,917,654
[45] Date of Patent: Jun. 29, 1999

[54] COUNTER-COUNTER OPTICAL DEVICE (U)

[75] Inventor: Aubrey J. Dunn, Springfield, Va.

[73] Assignee: The United States of America as represented by the Secretary of the Army, Washington, D.C.

[21] Appl. No.: 06/611,223

[22] Filed: Apr. 13, 1984

[51] Int. Cl.[6] .............. G02B 27/00; G02B 5/28; G01B 9/02; G01J 5/02
[52] U.S. Cl. .............. 359/614; 356/351; 356/352; 359/589; 250/339.01; 250/216; 250/225
[58] Field of Search .................. 356/351, 352; 350/316, 395, 404; 359/614, 589, 590, 487, 498; 250/339.01

[56] References Cited

U.S. PATENT DOCUMENTS 3,792,916  2/1974  Sarna ........................... 350/316
4,487,478  12/1984  Jackson ......................... 350/316

OTHER PUBLICATIONS

Jenkins et al., *Fundamentals Of Optics*, 4th Ed., 1976, Mcgraw–Hill, p.498.

*Primary Examiner*—Stephen C. Buczinski
*Attorney, Agent, or Firm*—Milton W. Lee; Aubrey J. Dunn; Robert P. Gibson

[57] ABSTRACT

Two Fabry-Perot interference filters are used as tandum polarizers for a high-power laser beam counter measure in an optical scene. The scene radiation is directed on one polarizer; one plane of polarization of the laser beam is transmitted thereby and the other scene radiation is reflected to the other polarizer. The other polarizer transmits the other plane of polarization of the laser beam and reflects the other scene radiation to a photodetector, such as an image intensifier, infrared imager, television camera tube, or a human eye. The laser beam transmitted by the polarizers is trapped by absorbers and cannot harm the photodetector.

2 Claims, 1 Drawing Sheet

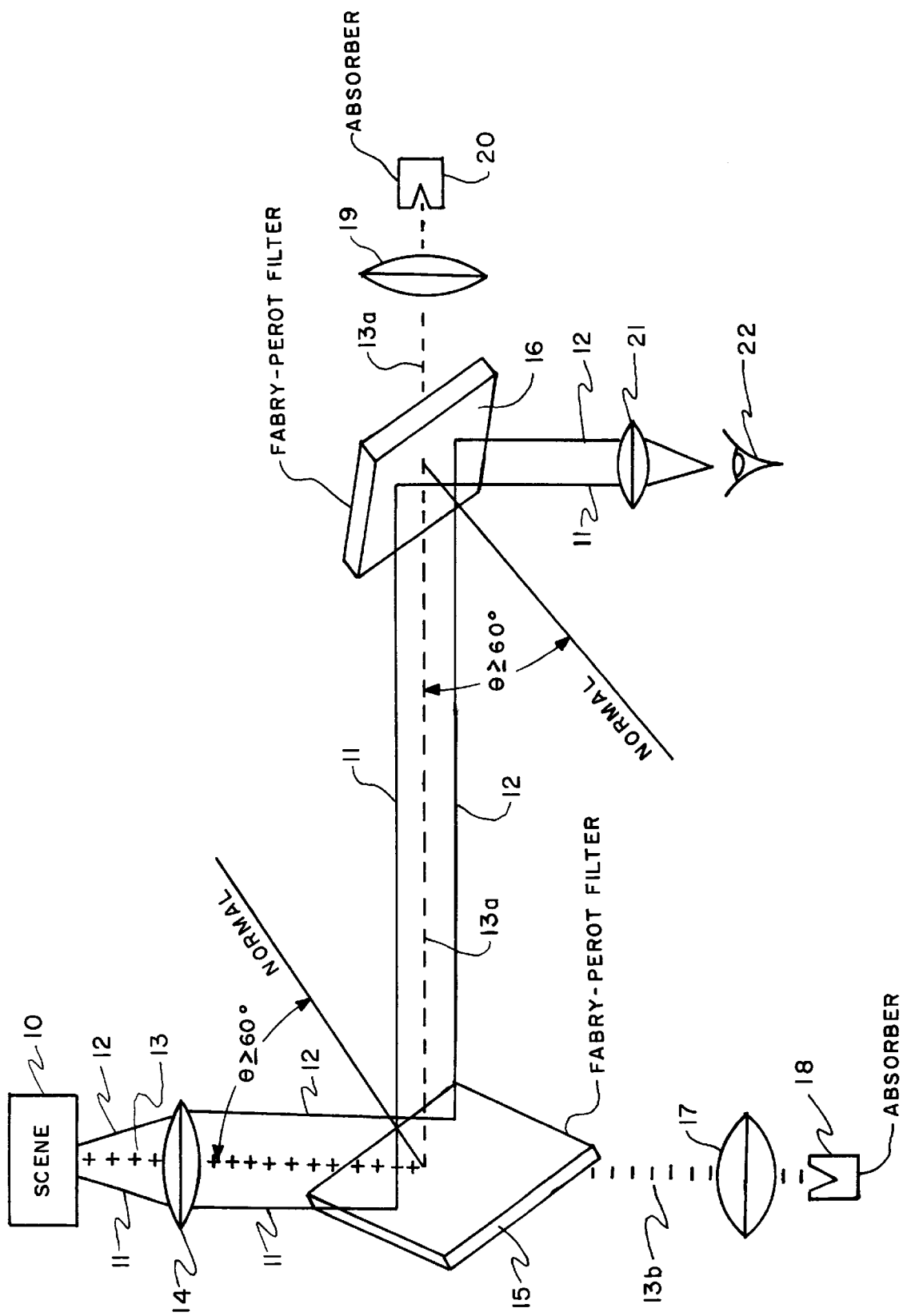

COUNTER-COUNTER OPTICAL DEVICE (U)

The invention described herein may be manufactured, used, and licensed by the U.S. Government for governmental purposes without the payment of any royalties thereon.

BACKGROUND OF THE INVENTION

This invention is in the field of optical viewers or detectors such as $I^2$ (image intensification) and IR (infrared). In particular, it is concerned with providing a device which is able to counter one of the counter-measures used against such viewers. This counter-measure is the high-power laser; such a laser can do temporary or permanent damage to a sensitive optical device (or to the human eye, for that matter). Various schemes have been made and proposed for dealing with laser counter-measures; these schemes include fast-acting electro-optical shutters, absorbing filters, and interference filters. Also, various birefringent materials are used, taking advantage of their acusto-optical or electro-optical properties. Unfortunately, all of these schemes have one disadvantage which makes them unsuitable for use as counter-counter measures against high-power lasers; although some of the schemes can theoretically block 100% of high-power laser energy in a short enough time to prevent damage to sensitive optical devices, their performances in practice fall short of 100%. Moreover, most such schemes temporarily block, on an optical device optical path, all radiation from a scene (both desired radiation and counter-measure radiation). The device is thus temporarily "blinded" during counter measures. The instant invention transmits 100% of counter-measure radiation from an optical scene while reflecting the at least part of remainder of the scene radiation to a detector. Thus, the invention allows observation of a scene during counter means; the counter-measure source (laser) will appear as a dark spot in a scene observed by a positive imaging viewer.

SUMMARY OF THE INVENTION

This invention is an optical device usable in the presence of optical counter measures such as high-power lasers operating in the response band of the viewer. The device includes a pair of interference filters used as tandem polarizers for counter-measure laser radiation from a scene. One filter transmits one plane of polarization of the counter-measure radiation and reflects a portion of the remainder of the scene radiation. The reflected radiation is directed onto the other polarizer, whose plane of polarization is rotated 90° about the device optical axis. This other polarizer transmits the other plane of polarization of the reflected counter-measure radiation and reflects a portion of the scene radiation onto an optical detector. This detector may be $I^2$, IR, or television camera tube, or the human eye.

BRIEF DESCRIPTION OF THE DRAWINGS

The single drawing figure is a schematic isometric representation of the invention.

DESCRIPTION OF PREFERRED EMBODIMENT

The invention might be best understood when this description is taken in conjunction with the drawing. In the drawing, numeral 10 designates an optical scene employing a counter-measure laser or other high-power optical source. The normal radiation from the scene is indicated by exemplary rays 11 and 12. Additionally, countermeasure laser ray 13 originates in the scene; although laser radiations are usually plane polarized, it is assumed that ray 13 has radiation in both ordinary and extraordinary planes of polarization. On this assumption, no matter what the polarizating orientation of ray 13, it will be diverted by the invention. Rays 11, 12, and 13 are collimated by lens 14 and fall on plate 15. This plate is a thin-film Fabry-Perot interference filter for ray 13, i.e., partially reflective films separated by a distance dependent on the wavelength of ray 13 such that the filter is a good transmitter for 13. The filter is not used in its normal mode, however, wherein radiation is directed with a 0° angle of incidence. Instead, ray 13 (and rays 11 and 12) fall on 15 at an angle $\theta \geq 60°$. As set forth in the book *Advanced Optical Techniques*, Edited by A. C. S. Van Heel and bearing Library of Congress Catalog Card Number 67-20004, page 187, 15 acts as a polarizer for ray 13. Rays 11 an 12, and one plane of polarization of ray 13 (shown as ray 13a) are thus parallel to an optical axis between plate 15 and plate 16 (yet to be described) The other plane of polarization of ray 13 (shown as ray 13b) is transmitted through plate 15, and is directed by lens 17 into absorber 18. Rays 11, 12, and 13a fall on plate 16; rays 11 and 12 are reflected, and ray 13a is transmitted through 16 and lens 19 into absorber 20. All of rays 11, 12, and 13a impinged onto 16 at an incident angle $\theta \geq 60°$. Plate 16, which is another thin-film Fabry-Perot interference filter, is rotated about a line (optical axis) between 15 and 16 may be visualized as follows: imagine the bottom edges of 15 and 16 resting on a common plane. Plate 15 is inclined to this plane at an angle of 30° or less, such that ray 13a, when reflected from plate 15, is parallel to the common plane. Plate 16 is perpendicular to the common plane and at an angle with respect to ray 13a such that ray 13a impinges at 60° or greater, and is transmitted by 16. Rays 11 and 12 are reflected and are focussed by lens 21 onto photodetector 22. For the sake of illustration, 22 is shown as a human eye, which it may be if the scene is in daylight and is being observed in visible light. For low visible-light levels, and $I^2$ or IR photodetector may be used; IR photodetectors may also be used for a scene having a hidden (by camoflage or folige) target, as is well known in the art.

Although no specific high-power laser has thus far been identified herein, one which comes to mind is the $CO_2$ laser operating at 10.6μm. A Fabry-Perot interference filter for this wavelength cannot be simply constructed of silver or aluminum partial reflecting layers, but must use gold or some other efficient reflector for 10.6 μm. Whatever the wavelength of the laser, the most desirable Fabry-Perot filter is probably one composed of thin films, by the well-known techniques. Obviously, since plates 15 and 16 are wavelength sensitive, they must be chosen in accordance with the wavelength of the countermeasure laser being used.

I claim:

1. An optical device for separating radiation of a particular predetermined wavelength from an optical scene emitting or reflecting a spectrum including a plurality of radiation wavelengths, the device including:

first polarizing means consisting of a Fabry-Perot interference filter for said particular predetermined wavelength;

means for directing the scene spectrum onto said first polarizing means at an angle of incidence at least equal to 60°, whereby one plane of polarization of said particular predetermined wavelength is transmitted and at least a portion of the remainder of said spectrum is reflected by said first polarizing means;

second polarizing means, consisting of a Fabry-Perot interference filter for said particular predetermined wavelength, whereby the scene spectrum reflected from said first polarizing means falls on said second polarizing means at an angle of incidence at least equal to 60°, and said second polarizing means transmits the other plane of polarization of said particular predetermined wavelength and reflects at least a portion of the remainder of said spectrum;

a photodetector; and means for directing that portion of said spectrum reflected by said second polarizing means onto said photodetector.

2. The device as set forth in claim 1 further including means for absorbing radiation transmitted by said first and second polarizing means.

* * * * *